（12） United States Patent
Larsen (10) Patent No.: US 12,340,014 B1
(45) Date of Patent: Jun. 24, 2025

(54) USER ORIENTATION DETECTION USING MACHINE LEARNING COUNTER ALGORITHM

(71) Applicant: STMicroelectronics International N.V., Geneva (CH)

(72) Inventor: Carl Erik Larsen, Edinburgh (GB)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/584,856

(22) Filed: Feb. 22, 2024

(51) Int. Cl.
*G06F 3/01* (2006.01)
*G06F 3/04845* (2022.01)
*G06T 7/73* (2017.01)

(52) U.S. Cl.
CPC .......... *G06F 3/012* (2013.01); *G06F 3/04845* (2013.01); *G06T 7/73* (2017.01); *G06F 2200/1614* (2013.01); *G06T 2207/20084* (2013.01); *G06T 2207/30201* (2013.01)

(58) Field of Classification Search
CPC ............. G06F 3/012–013; G06F 3/048; G06F 3/0484; G06F 3/04845; G06F 3/0487; G06F 2200/1614
See application file for complete search history.

(56) References Cited

U.S. PATENT DOCUMENTS

| | | | | |
|---|---|---|---|---|
| 7,185,818 | B2 * | 3/2007 | Salvato | G06F 1/1622 235/462.46 |
| 7,726,576 | B2 * | 6/2010 | Salvato | H04M 1/0233 235/472.01 |
| 8,081,844 | B2 | 12/2011 | Steinberg | |
| 8,358,321 | B1 * | 1/2013 | Weidner | G06F 1/1686 345/619 |
| 8,471,869 | B1 * | 6/2013 | Tseng | G09G 5/38 345/158 |
| 9,262,999 | B1 * | 2/2016 | Froment | G06F 3/0304 |
| 9,342,143 | B1 * | 5/2016 | Rhodes | G06F 1/1686 |

(Continued)

FOREIGN PATENT DOCUMENTS

| | | |
|---|---|---|
| CN | 111753596 A | 10/2020 |
| WO | 2021221614 A1 | 11/2021 |

OTHER PUBLICATIONS

Gossweiler, Rich et al., "What's up CAPTCHA? A CAPTCHA Based on Image Orientation," In Proceedings of the 18th international conference on World wide web, Apr. 20, 2009, pp. 841-850.

(Continued)

*Primary Examiner* — Patrick F Marinelli
(74) *Attorney, Agent, or Firm* — Slater Matsil, LLP (57) ABSTRACT

According to an embodiment, a method for determining an orientation of an object in a field-of-view of a time-of-flight sensor is proposed. The method includes receiving a sensor readout from the time-of-flight sensor; feeding the sensor readout as an input to a neural network, the neural network trained on a set of data with a binary output that classifies the input as being valid or invalid based on the orientation of the object with respect to the time-of-flight sensor; rotating the sensor readout for a set number of rotations and feeding each rotation as an input to the neural network to determine a valid orientation of the object; and rotating an image on a display interface based on the rotation corresponding to the valid orientation of the object as determined by the neural network.

20 Claims, 10 Drawing Sheets

(56) References Cited

U.S. PATENT DOCUMENTS

| | | | | |
|---|---|---|---|---|
| 9,424,798 | B2* | 8/2016 | Park | G06F 1/1624 |
| 9,565,365 | B2* | 2/2017 | Gardiner | G06F 1/1626 |
| 10,228,766 | B2* | 3/2019 | Bhesania | G06F 3/04845 |
| 10,346,720 | B2 | 7/2019 | Zhang | |
| 11,100,608 | B2* | 8/2021 | Rhodes | G06F 1/1694 |
| 11,119,638 | B2* | 9/2021 | Ho | G06F 3/017 |
| 11,270,668 | B1* | 3/2022 | Raynor | G06F 3/0346 |
| 11,402,981 | B2* | 8/2022 | Jang | G06F 3/0346 |
| 11,586,407 | B2* | 2/2023 | Back | H04R 3/005 |
| 11,716,300 | B2* | 8/2023 | Ravine | G06F 3/04883 709/206 |
| 2004/0245334 | A1* | 12/2004 | Sikorski | G06F 3/147 235/383 |
| 2012/0057064 | A1* | 3/2012 | Gardiner | H04M 1/72454 348/E5.022 |
| 2013/0057571 | A1* | 3/2013 | Harris | G06F 1/1613 345/619 |
| 2013/0120458 | A1* | 5/2013 | Celebisoy | G06F 3/147 345/619 |
| 2014/0062860 | A1* | 3/2014 | Lee | G06F 3/0304 345/156 |
| 2016/0077592 | A1* | 3/2016 | Bhesania | G06F 3/013 345/650 |
| 2016/0274622 | A1* | 9/2016 | Braun | G06F 1/1626 |
| 2019/0080498 | A1 | 3/2019 | Horie | |
| 2019/0156460 | A1* | 5/2019 | Rhodes | G06F 3/011 |
| 2020/0104033 | A1* | 4/2020 | Ho | G06V 40/172 |
| 2020/0380935 | A1* | 12/2020 | Ignaszewski | G06F 1/1622 |
| 2021/0099505 | A1* | 4/2021 | Ravine | G06F 3/0346 |
| 2021/0312646 | A1 | 10/2021 | Legendre | |
| 2022/0051440 | A1 | 2/2022 | Fisch | |
| 2022/0261567 | A1 | 8/2022 | Rodriguez | |
| 2022/0368793 | A1* | 11/2022 | Xu | G06F 1/1694 |
| 2023/0063047 | A1* | 3/2023 | Schmitt | G06V 20/58 |

OTHER PUBLICATIONS

Shima, Yoshihiro, et al., "Detecting Orientation of In-Plain Rotated Face Images Based on Category Classification by Deep Learning," Proc. of the 2017 IEEE Region 10 Conference (TENCON), Malaysia, Nov. 5-8, 2017, 6 pages.

Robert (https://stats.stackexchange.com/users/74274/robert), Neural Network: For Binary Classification use 1 or 2 output neurons?, Stack Exchange, URL (version: Apr. 13, 2017): https://stats.stackexchange.com/q/207049, 2 pages.

Picaro, Elyse Betters, "How to use Android 12's new auto-rotate screen with face detection feature," Pocket-lint, Updated Aug. 24, 2021, 5 pages.

* cited by examiner

USER ORIENTATION DETECTION USING MACHINE LEARNING COUNTER ALGORITHM

TECHNICAL FIELD

The present disclosure generally relates to electronic displays and, in particular embodiments, to automated user orientation detection using a machine learning counter algorithm.

BACKGROUND

Electronic displays are typically integrated with various sensors to detect the device's orientation and adjust the display content accordingly. The most common sensors used for this purpose include accelerometers and gyroscopes. These sensors measure acceleration and rotational motion, enabling the device to determine its position in space and alter the display orientation from portrait to landscape or vice versa.

However, there are situations when these sensors can create issues with user orientation, particularly when the user is in a non-standard position. For example, when a user is lying down, accelerometers and gyroscopes can incorrectly interpret the device's position since gravity is acting on the sensors unconventionally. The device may automatically rotate to landscape mode by assuming that that's the intended viewing orientation based on the direction of gravity it senses, even though the display is in portrait mode to the user.

As another example, users often hold their devices in various ways that are not perpendicular or parallel to the ground. Unique holding positions, such as when reading on your side or while inclined on a couch, might not provide clear orientation cues to the sensors. In these cases, the device may frequently switch between orientations, which can be frustrating.

As yet another example, a phone can be laying on a horizontal surface (e.g., table or ground) with the user peering into the device. The conventional gyroscope-based method is unable to sense the orientation that the user is interacting with the device.

Moreover, most conventional orientation sensors have certain blind spots or thresholds to prevent unwanted orientation switching due to minor movements. In non-typical postures, movements may fall within these blind spots, leading to a lack of response from the device when an orientation change is desired. Further, usage in motion (like in a vehicle) or external vibrations can cause erratic sensor readings making stable orientation detection difficult.

SUMMARY

Technical advantages are generally achieved by embodiments of this disclosure, which describe automated user orientation detection using a machine learning counter algorithm in an electronic display.

A first aspect relates to a method for determining an orientation of an object in a field-of-view of a time-of-flight sensor. The method includes receiving a sensor readout from the time-of-flight sensor; feeding the sensor readout as an input to a neural network, the neural network trained on a set of data with a binary output that classifies the input as being valid or invalid based on the orientation of the object with respect to the time-of-flight sensor; rotating the sensor readout for a set number of rotations and feeding each rotation as an input to the neural network to determine a valid orientation of the object; and rotating an image on a display interface based on the rotation corresponding to the valid orientation of the object as determined by the neural network.

A second aspect relates to a system. The system includes a time-of-flight sensor, a non-transitory memory, and a processor. The time-of-flight sensor is configured to measure a distance between it and an object in its field of view. The non-transitory memory storage includes instructions. The processor is in communication with the non-transitory memory storage and the time-of-flight sensor. The instructions, when executed by the processor, cause the system to receive a sensor readout from the time-of-flight sensor, feed the sensor readout as an input to a neural network, the neural network trained on a set of data with a binary output that classifies the input as being valid or invalid based on an orientation of the object with respect to the time-of-flight sensor, rotate the sensor readout for a set number of rotations and feed each rotation as an input to the neural network to determine a valid orientation of the object, and rotate an image on a display interface based on the number of rotations that would align the original image with the valid orientation of the object as determined by the neural network.

A third aspect relates to a non-transitory computer-readable media storing computer instructions. The instructions, when executed by a processor, cause the processor to receive a sensor readout from a time-of-flight sensor for an object in a field-of-view of the time-of-flight sensor; feed the sensor readout as an input to a neural network, the neural network trained on a set of data with a binary output that classifies the input as being valid or invalid based on an orientation of the object with respect to the time-of-flight sensor; rotate the sensor readout for a set number of rotations and feed each rotation as an input to the neural network to determine a valid orientation of the object; and rotate an image on a display interface based on the rotation corresponding to the valid orientation of the object as determined by the neural network.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise. Various embodiments are illustrated in the accompanying drawing figures, where identical components and elements are identified by the same reference number, and repetitive descriptions are omitted for brevity.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of a machine learning algorithm to run on memory-constrained hardware to detect a user's cardinal orientations for automatic screen rotation, it should also be appreciated that these inventive aspects may also apply to other commercial or consumer applications such as detecting box orientation in a warehouse, cardinal gesture detection on a handheld device, or determining the orientation of an image (e.g., identification card) by a scanner.

Further, aspects of the disclosure are described with respect to a time-of-flight sensor; however, it should be appreciated that in embodiments, the data from, for example, a digital camera (or, for example, a dedicated low-pixel camera module) or a light detection and ranging (LiDAR) of the device can be used instead of the time-of-flight sensor. In addition, in embodiments, the peak rate for the ranging pixels may be used instead of a readout (i.e., depth map) from a range output of the time-of-flight sensor.

Moreover, although a neural network is discussed as the type of machine learning language used to determine a valid or an invalid output based on different rotations of the original readout, it should be appreciated that in embodiments, the machine learning language is not limited to neural networks. For example, Support Vector Machines (SVMs), Naive Bayes, Decision Trees, Gradient Boosting Machines (GBMs), Evolutionary Algorithms, or Genetic Algorithms may be used instead of the neural network disclosed herein.

The ability to detect user orientation is a critical feature in smartphones and tablets to facilitate seamless screen rotation and simultaneously ascertain the user's presence. By capitalizing on this capability, devices can intelligently adjust their display from portrait to landscape modes, enhancing user interaction and readability according to the orientation in which the device is held. Moreover, incorporating presence detection allows the device to recognize when a user is actively engaging, thereby enabling power-saving features or content interaction responsiveness, effectively bridging the gap between user experience and device functionality. This dual application of orientation and presence detection in electronic displays exemplifies the evolving synergy between sophisticated sensor technology and user-centric design.

Aspects of this disclosure propose embodiments that significantly improve the efficiency of machine learning algorithms used for cardinal orientation detection by significantly reducing the required memory (e.g., by a factor of two). Such optimization can be crucial considering the memory constraints in, for example, internal microcontroller units that operate with limited memory capacities.

Figure 1:
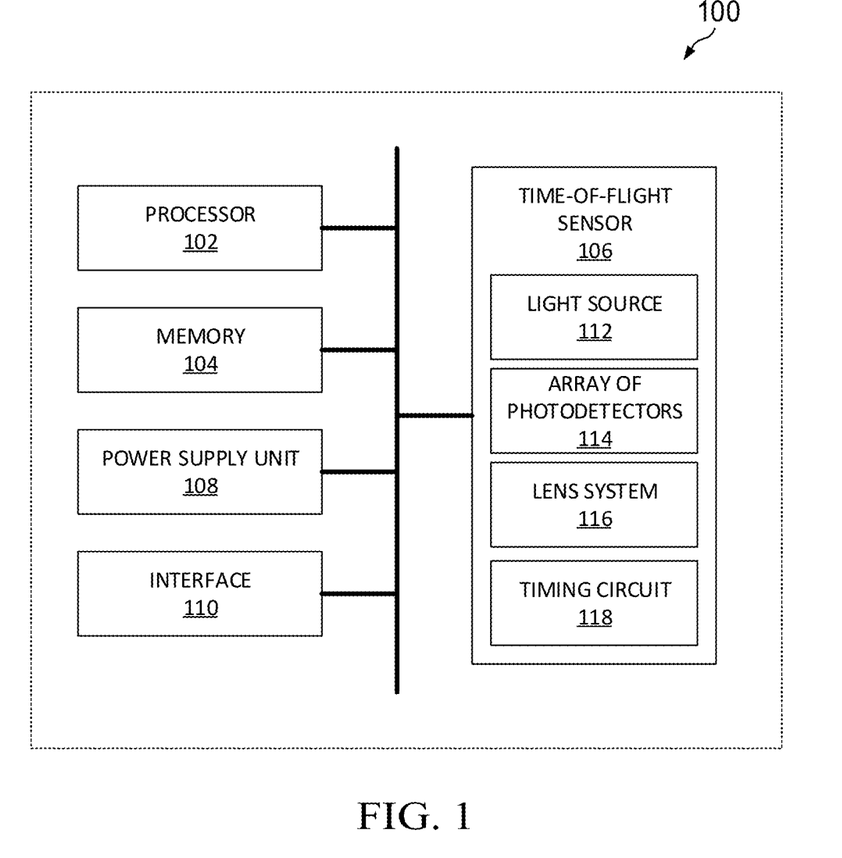
FIG. 1 is a block diagram of an embodiment system.

FIG. 1 illustrates a block diagram of an embodiment system 100. System 100 includes a processor 102, a memory 104, a time-of-flight (ToF) sensor 106, a power supply unit (PSU) 108, and an interface 110, which may (or may not) be arranged as shown. Although one of each (i.e., the processor 102, the memory 104, the ToF sensor 106, the power supply unit 108, and the interface 110) is shown in FIG. 1, the number of components is not limiting, and greater numbers are similarly contemplated in other embodiments. System 100 may include additional components not depicted, such as long-term storage (e.g., non-volatile memory, etc.), power management circuitry, security and encryption modules (e.g., trusted platform modules (TPM), etc.), or the like. System 100 may be an electronic device, such as a smartphone, a tablet, a laptop, a smartwatch, a vehicle, or any system or sub-system capable of hosting the ToF sensor 106.

In embodiments, each component can communicate with any other component internally within or external to the system 100. For example, each component can communicate using the I2C (Inter-Integrated Circuit), alternatively known as I2C or IIC, communication protocol, the I3C (Improved Inter Integrated Circuit) communication protocol, the serial peripheral interface (SPI) specification, or the like.

Processor 102 may be any component or collection of components adapted to perform computations or other processing-related tasks. In embodiments, processor 102 is an application processor or a microcontroller.

Memory 104 may be any component or collection of components adapted to store programming or instructions for execution by processor 102. In an embodiment, memory 104 includes a non-transitory computer-readable medium.

ToF sensor 106 measures the distance between it and objects in its field of view by utilizing the speed of light. ToF sensor 106 emits a light signal, which travels to the target object, reflects off it, and then is captured back by the ToF sensor 106. The time taken for this round trip is measured—and because the speed of light is constant, the distance to the object can be calculated accurately by the ToF sensor 106 using this time measurement.

ToF sensor 106 includes a light source 112, typically an infrared (IR) LED, a laser diode, or a vertical-cavity surface-emitting laser (VCSEL). The light source 112 emits a light signal towards an object to be measured. In embodiments, ToF sensor 106 uses a continuous wave of light. In embodiments, ToF sensor 106 uses pulsed light signals. On the receiving end of the signal, there is an array of photodetectors 114 sensitive to the specific wavelength of the emitted light. ToF sensor 106 may include a lens system 116 to focus the emitted light into a beam and to ensure that reflected light is directed onto the array of photodetectors 114. In embodiments, the array of photodetectors 114 is a Single Photon Avalanche Diode (SPAD) detection array. ToF sensor 106 may include additional components not shown, such as memory, a microcontroller, and a VCSEL driver. In should be noted that in embodiments, the system 100 is implemented with a conventional camera and not necessarily a ToF device.

ToF sensor 106 may include a timing circuit 118, responsible for accurately measuring the interval between when the light is emitted and when it is detected after reflection. In embodiments, processor 102 receives data from the ToF sensor 106, interprets the timing data, and converts it into distance measurements. The processor 102 may apply algorithms to refine the data, compensating for factors like ambient light noise or object reflectivity variations to provide more reliable distance information. ToF sensor 106 may be a multi-zone ToF sensor that can measure distances in several separate zones, such as but not limited to 4×4, or 8×8 or 32×32.

Power supply unit 108 may be any component or collection of components that provide power to one or more components within the system 100. Power supply unit 108 may include various power management circuitry, charge storage components (i.e., battery), and the like.

Interface 110 may be any component or collection of components that allow processor 102 to communicate with other devices/components or a user. For example, interface 110 may be adapted to allow a user or ToF sensor 106 to interact/communicate with the system 100.

Figure 2:
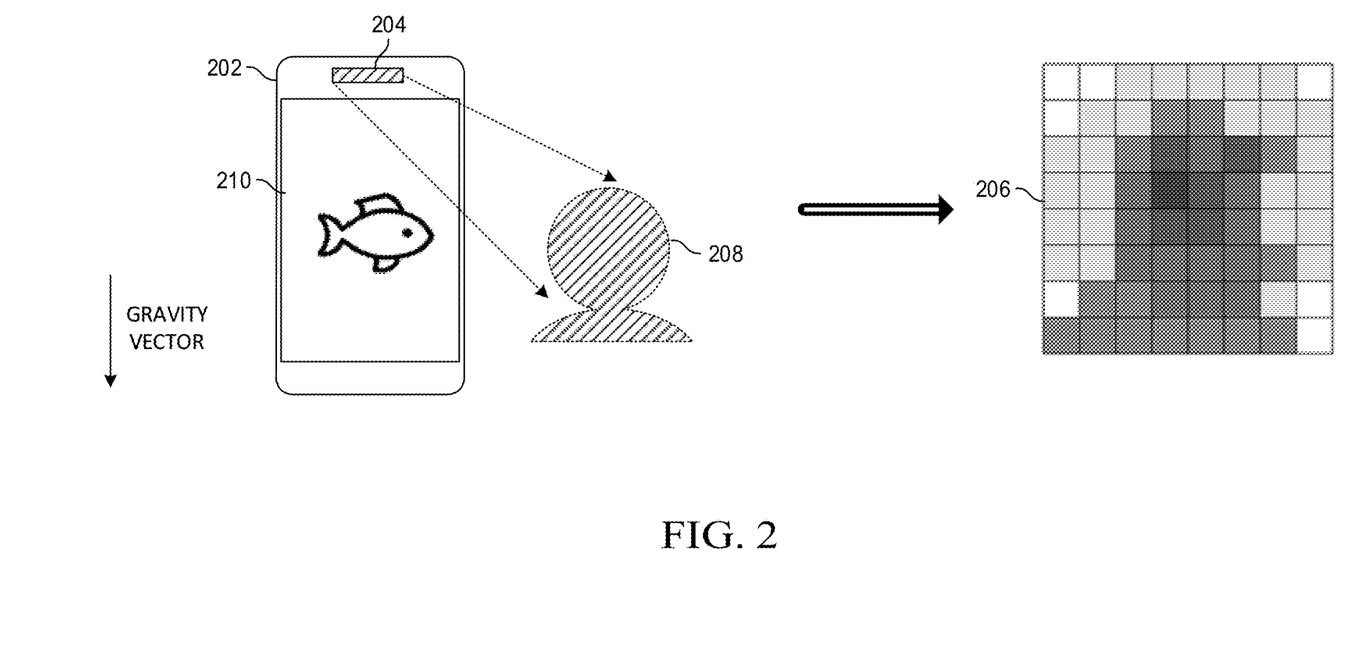
FIG. 2 is an electronic device oriented in one of two portrait modes and the readout from a time-of-flight sensor.

FIG. 2 illustrates an electronic device 202 oriented in one of two portrait modes and the readout 206 from a time-of-flight sensor (ToF) 204. The ToF sensor 204 may be implemented as the ToF sensor 106, and the electronic device 202 may include the components shown in the system 100. Electronic device 202 is oriented such that it is on the same plane as the gravity vector, indicating that electronic device 202 is positioned upright and in portrait mode. This orientation can correlate with how a user 208 holds the electronic device 202 standing for tasks such as making phone calls or the like. The electronic device 202 includes a display interface 210, illustrating a fish in portrait mode. In embodiments, the user 208 can be any object, such as an identification card, image, or parcel.

It is noted that although a phone (e.g., smartphone) is illustrated in FIG. 2 as an example representing the orientation with respect to a user 208, it should be appreciated that the structure and functions described herein similarly apply to any electronic device, such as a tablet, a laptop, a smartwatch, home assistant, a vehicle, or any system or sub-system capable of hosting the ToF sensor 204 or a camera system.

The array of photodetectors 114 of the ToF sensor 204, combined with the processor 102, generates a readout 206. Readout 206 illustrates point distance measurements and spatial depth maps of the area in view, which can be used to create 3D representations of surrounding objects and environments. Accordingly, although readout 206 is a two-dimensional grid pattern, the varying shades of gray portray a map-like interface that could be utilized to identify the head orientation of user 208. The shadings within the readout 206 denote depth and distance relative to the orientation of the ToF sensor 204. Thus, lighter and darker shades within the grid can be used to infer how far or close certain objects are, notably the head of user 208 from the ToF sensor 204. Note that this could also be a map of intensity (total photon counts) instead of range or a low-resolution camera system. In embodiments, the readout 206 can be output from a light detection and ranging (LiDAR) device, such as a point cloud.

Figure 3:
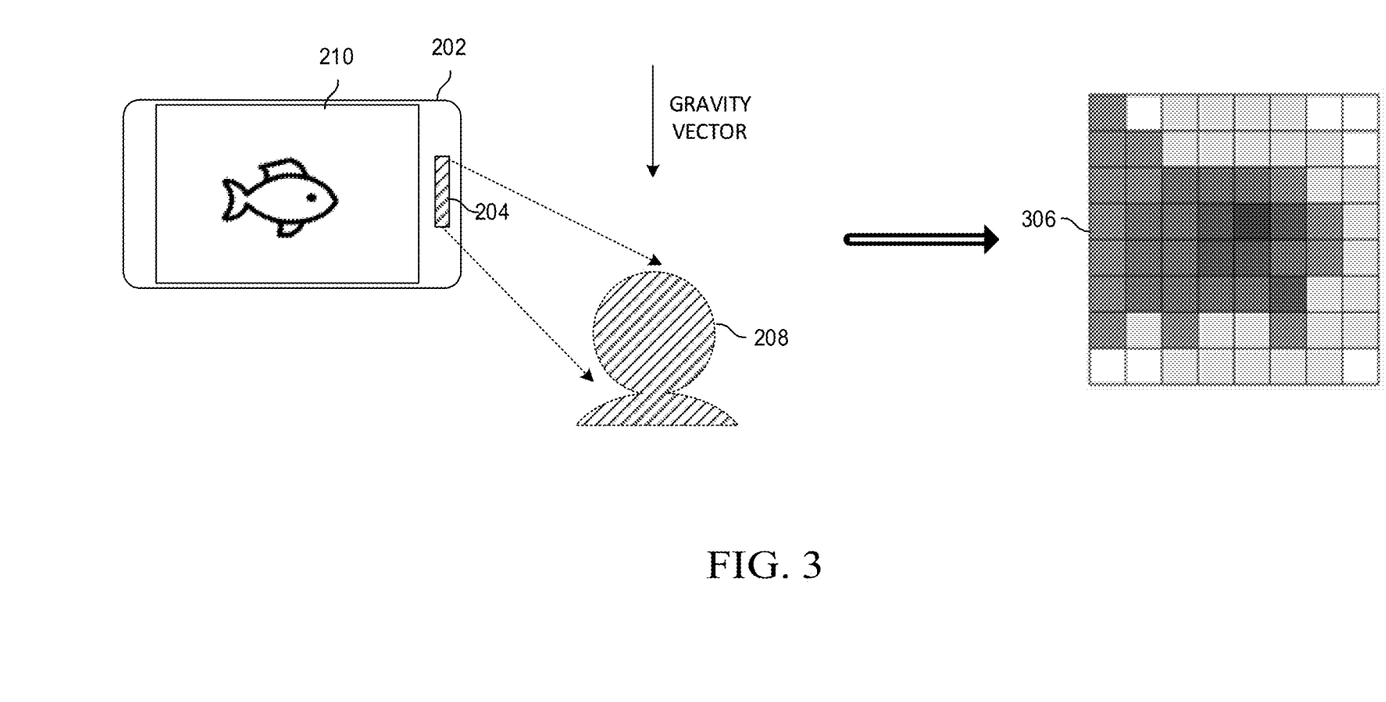
FIG. 3 is the electronic device oriented in one of two landscape modes and the readout from the ToF sensor.

FIG. 3 illustrates the electronic device 202 oriented in one of two landscape modes and the readout 306 from the ToF sensor 204. The description of the structure and function of identical components with the same reference number in FIGS. 2 and 3 will not be repeated to simplify the discussion and avoid unnecessary duplication.

Electronic device 202 is oriented such that it is on the same plane as the gravity vector, indicating that electronic device 202 is positioned upright and in landscape mode. This orientation can correlate with how a user 208 holds the electronic device 202 in a standing position for tasks such as browsing the internet, watching videos, taking pictures, playing games or the like. The display interface 210 shows a fish in landscape mode.

The array of photodetectors 114 of the ToF sensor 204, combined with the processor 102, generates a readout 306. Readout 306 is a two-dimensional grid pattern, with varying shades of gray portraying a map-like interface that could be utilized to identify the head orientation of user 208. The shadings within the readout 306 denote depth and distance relative to the orientation of the ToF sensor 204. Lighter and darker shades within the grid can be used to infer how far or close certain objects are or the intensity of the light received from different areas of the scene, notably the head of user 208 from the ToF sensor 204.

Embodiments of this disclosure utilize a machine learning (ML) counter algorithm to efficiently determine the orientation of the ToF sensor 204 relative to the head of the user 208 based on the readout 206, 306. The proposed ML model provides a binary output that indicates if the orientation of the image in its state fed into the network matches an upright orientation. Although the "yes," correct, true, or '1' output can be defined as any of the four cardinal orientations in advance based on the labeling of the training for the neural network (i.e., the network could also be trained to have a 90-degree image as the correct output and count based off that). The 'true' orientation is not limited to the upright orientation, and any direction may be set as the correct reference orientation.

For example, if the analysis of the original readout 206 and 306 against a trained model provides a valid binary output (e.g., '1'), the head of user 208 is oriented in the same orientation as what is being displayed on the display interface 210. However, if an invalid binary output (e.g., 'o') is determined, the readout 206, 306 is rotated. The invalid binary output results from comparing the original readout 206 and 306 against the trained model and determining that the head of user 208 is not oriented in the same orientation as displayed on the display interface 210.

If the binary output is again determined to be valid after the rotation, the readout 206, 306 is again rotated. This process is repeated until a valid binary output is determined. If none of the rotations result in a valid binary output, it is suggested that the intended target (e.g., head of the user 208) is absent from the field of view of the ToF sensor 204 and the process is ended. Based on the number of rotations and the angle of rotation, the orientation of the head of the user with respect to what is displayed on the display interface 210 is determined. These and additional details are further detailed below.

Figure 4:
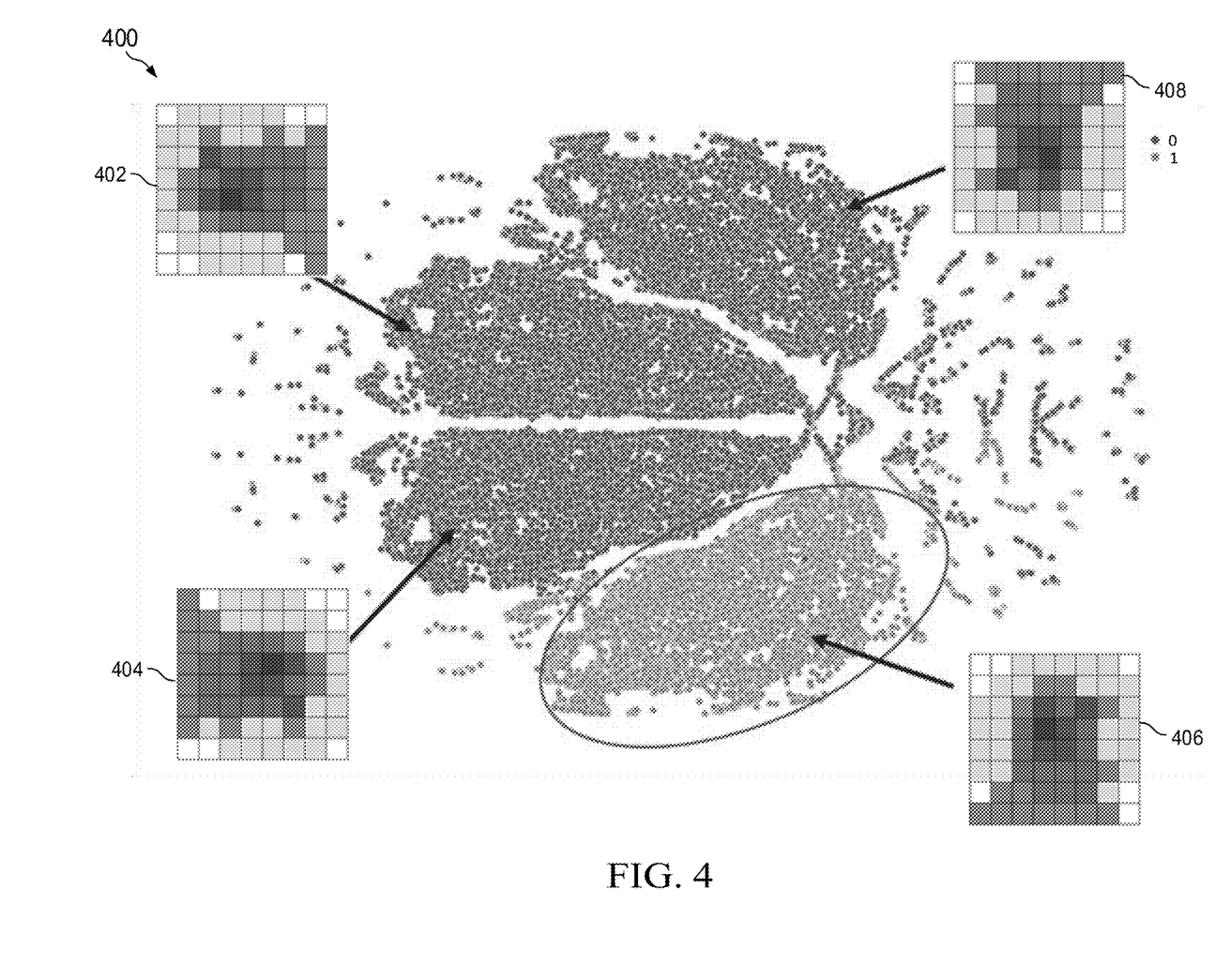
FIG. 4 is a t-distributed Stochastic Neighbor Embedding (t-SNE) of a training data with a binary type of classification for training a machine learning algorithm.

FIG. 4 illustrates a t-distributed Stochastic Neighbor Embedding (t-SNE) of the training data 400 with a binary type of classification for training a machine learning algorithm, specifically a neural network, to differentiate between valid and invalid head positions. The training data set consists of various examples of readouts 206, 306 and head orientations of user 208 captured from different angles. These varied orientations provide a training set the neural network uses to accurately discern between valid and invalid head positions (as defined before training, with one of North, South, East, and West being labeled true) relative to the display interface 210.

The first orientation 402 corresponds to the head of user 208 rotated 90 degrees counterclockwise. This specific orientation is an example of an invalid position within the context of the neural network's operational guidelines. Including such an orientation in the training data helps the neural network identify and reject similar invalid orientations during actual use.

The second orientation 404 depicts the head of user 208 rotated 90 degrees clockwise. Like the first orientation, this, too, is classified as invalid within the system parameters.

The 'upright' orientation, represented as the third orientation 406, demonstrates the designated valid orientation of the user's head. In this scenario, the head of user 208 is aligned in its natural, upright position, which is deemed acceptable by system 100.

The fourth orientation 408 illustrates the head of user 208 rotated 180 degrees, effectively representing an upside-down position. Such an orientation falls under the invalid category, similar to the first orientation 402 and the second orientation 404. By incorporating this upside-down head position into the training data set, the neural network is refined to distinguish this improper head alignment from the valid cardinal orientation of the third orientation 406.

Accordingly, the first orientation 402, the second orientation 404, and the fourth orientation 408 exemplify various improper orientations that must be recognized by the system 100 as invalid. In contrast, the third orientation 406 embodies the sole acceptable (head upright, facing forward) stance to be identified and affirmed as valid. Thus, except for third orientation 406, all other positions are categorized as invalid by their rotational deviations from the desired 'upright' head alignment.

Figure 5:
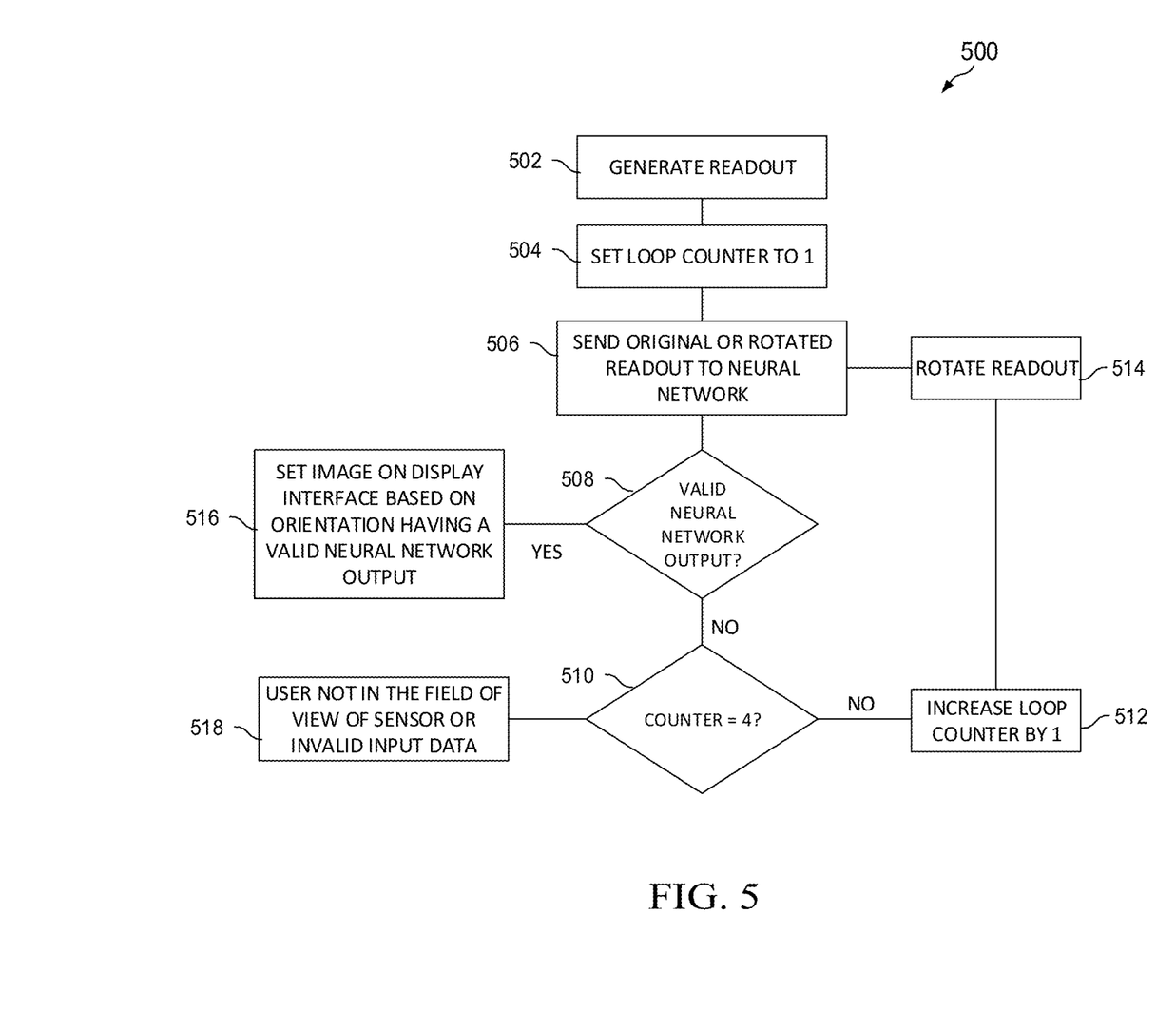
FIG. 5 is a flow chart of an embodiment method for operating a neural network of the system in FIG. 1.

FIG. 5 illustrates a flow chart of an embodiment method 500 for operating a neural network in system 100. Method 500 is used to determine the correct orientation of an image on the display interface 210 based on a three-dimensional (3D) readout, specifically from the ToF sensor 204, with a trained neural network.

It is noted that all steps outlined in the flow charts of the method are not necessarily required and can be optional. Further, changes to the arrangement of the steps, removal of one or more steps and path connections, and addition of steps and path connections are similarly contemplated.

At step 502, a readout is generated from the ToF sensor 204. The readout is generated when the ToF sensor 204 emits light and captures its reflection using the array of photodetectors 114. The captured data forms a grid pattern with varying shades that represents a 3D object within the field of view (FoV)—in this case, presumably the head of a user (user 208).

At step 504, following the initial readout generation, a counter is set up and initialized to a value of one. This counter will track the number of iterations or attempts made to ascertain the correct orientation of the user's head.

At step 506, with the counter at one, the original readout is fed as input into a neural network. This neural network has previously undergone training using training data 400. The neural network is developed to categorize the orientation of the user's head as either 'valid' or 'invalid.' A 'valid' classification means the user's head is detected as being in the third orientation 406, corresponding to the proper orientation for displaying an image on the display interface 210. An 'invalid' classification signifies that the user's head is in any other position—the first orientation 402, second orientation 404, or fourth orientation 408 orientation.

At step 508, should the neural network deem the original readout 'invalid,' the flow moves to step 510 to check the counter's value. If the counter is not at four, at step 512, the counter's value is incremented by one. By incrementing the counter at step 512, system 100 can check for each cardinal orientation. It should be appreciated that although four orientations are checked using method 500, in embodiments, additional orientations may also be checked by setting the maximum counter value (here, four) to any number greater than one.

For example, in an embodiment to determine the orientation of a box (e.g., with an identifying feature in one corner of the parcel) in a warehouse with respect to a storage space, which is aligned with the ToF sensor of a camera, the maximum counter value can be set to a number between four and 360. By setting the maximum counter value to four, the four cardinal orientations are checked. By setting the maximum counter value to 360, the angle of the box in single degrees can be determined by rotating the sensor readout by one degree and comparing it with a trained data set for an upright box. Accordingly, the maximum counter value is set based on the application and the computation resources available to determine the object's orientation in the field of view of the ToF sensor. In embodiments, a notification is generated by system 100 in response to the box being in an invalid orientation, corresponding to potential damage to the parcel.

At step 514, after the counter value is incremented, the image linked with the initial readout is rotated by 90 degrees or −90 degrees (i.e., clockwise or counterclockwise). The process returns to step 506, where the neural network re-evaluates this newly adjusted image for validity. If it remains 'invalid' and the counter is still less than four at step 510, this iterative process of checking and rotation continues.

At any point in this iterative process, if step 508 results in a 'valid' output from the neural network for either the original readout or any rotated version thereof, system 100, at step 516, acts accordingly by rotating the display image on the display interface 210 so that it matches the orientation that the neural network has validated. In embodiments, the machine learning model is invoked for each rotation regardless of whether a previous orientation resulted in a valid output.

At step 518, the process ends if the counter reaches a value of four after several iterations and no valid outputs have been recognized. This scenario implies that no appropriate orientation could be discerned, likely because either the user is not within the field of view of ToF sensor 204, the neural network has not been adequately trained to interpret the available data, or the input data to the neural network is invalid (e.g., corrupt).

Figure 6:
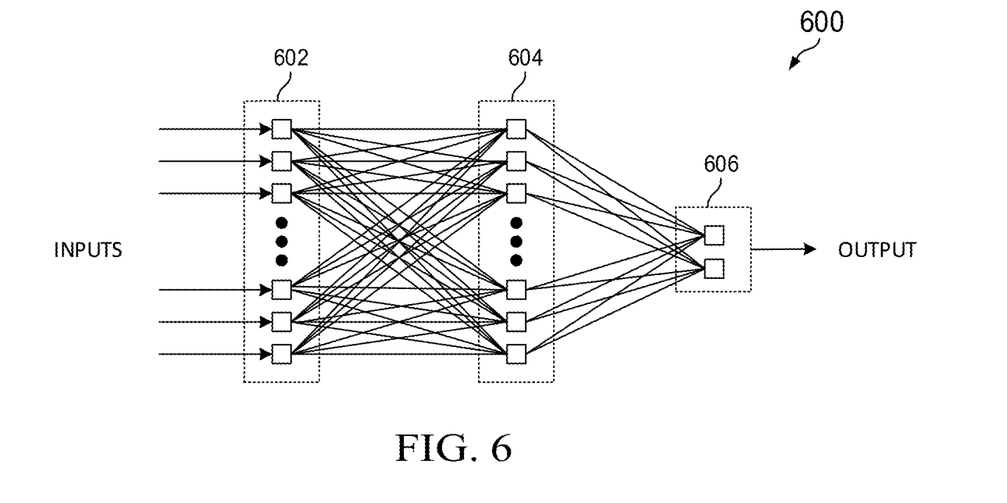
FIG. 6 is an example of a neural network, which may be implemented in the system of FIG. 1 in accordance with the method from FIG. 5.

In embodiments, system 100 checks each cardinal orientation regardless of whether a valid output is determined by the neural network 600. For example, as long as the counter is less than four, the sensor readout is rotated and fed as an input to the neural network regardless of whether the first rotation of the sensor readout provided a valid output. By analyzing all four orientations of the readout from the ToF sensor, we can determine if the head of user 208 is oriented in between the four cardinal orientations. For example, if the head of the user is rotated by 45 degrees clockwise with respect to the ToF sensor, the output of the neural network can provide a valid output for an input corresponding to the original readout and the original readout rotated by 90 degrees clockwise. System 100 can determine that the head of the user is rotated in between these two cardinal orientations and adjust the screen orientation on the display interface 210 accordingly or wait for a more definitive answer using subsequent readouts.

Alternatively, system 100 can modify the maximum counter value and repeat method 500 to provide a more accurate determination of the orientation of the head of user 208 with respect to the ToF sensor. For example, by setting the maximum counter value to 360, rotating the readout by one degree at each step, feeding the rotated readout to the neural network, and receiving a valid and invalid output, we can determine the degree that the head of the user is rotated through the increasing counter value. If, for example, the output of the neural network is valid after 157 counter values, the system 100 can determine that the head of the user (or any other object being analyzed) is rotated by 157 degrees. In such embodiments, to compare the rotation of the image, an averaging of overlapping pixel values, a subset of pixels within the readout, or high-resolution images may be used.

FIG. 6 illustrates an example of a neural network 600, which may be implemented in system 100 in accordance with method 500. As shown, neural network 600 includes an input layer 602, an optional hidden layer 604, and an output layer 606, which may (or may not) be arranged as shown and may (or may not) be the size as shown. Neural network 600 may include additional hidden layers not shown.

The input layer 602 includes multiple nodes (or neurons) that receive the input data. In this case, the input data to the neural network 600 is the readout (i.e., original readout or rotations of the original readout) generated from the ToF sensor 204. Each node represents either a rate (i.e., the intensity of the reflected signal) or a range (i.e., distance to an object) for each zone in a multi-zone ToF sensor. The range for each zone is calculated based on the time it takes for emitted light to travel to the object and back to the ToF sensor 106. The rate for each zone represents the strength of the reflected signal that the ToF sensor 106 receives.

Between the input layer 602 and the output layer 606 is the optional hidden layer 604 (although only a single hidden layer is shown in FIG. 6, additional or no hidden layers are contemplated in other embodiments). The hidden layer 604 consists of nodes that transform the inputs from the previous layer (here, the input layer 602) using weights, biases, and a non-linear activation function. Through training, based on the training data 400, the neural network 600 learns the appropriate weights and biases for these transformations to model the validity and invalidity classification for the orientation of the user against the ToF sensor.

In embodiments, the output layer 606 includes a single output node (as shown in FIGS. 7-10). The single node corresponds to a classification of a valid image based on a threshold value. For example, if the output of the neural network 600 is less than 0.5 (e.g., output equals zero), the result of the neural network 600 is 'invalid'. In contrast, if the output of the neural network 600 is greater than 0.5 (e.g., output equals one), the result of the neural network 600 is 'valid'.

In embodiments, the output layer 606 includes two output nodes (as shown in FIG. 6). The two nodes correspond to a classification of a 'yes' or 'valid' output and a 'no' or an 'invalid' output.

Figure 11:
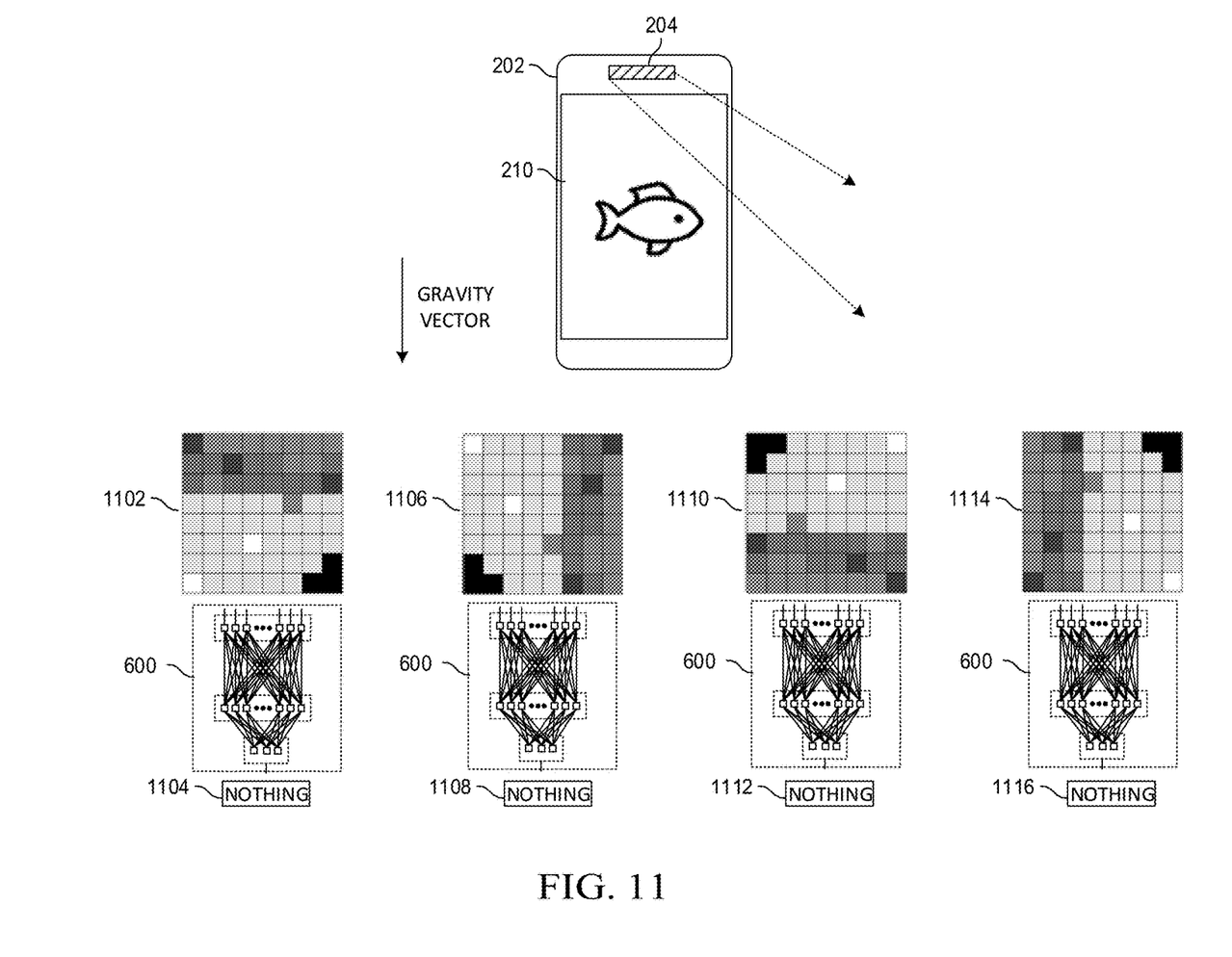

In embodiments, the output layer 606 includes three output nodes (as shown in FIG. 11). The three nodes correspond to a classification of a 'yes' or 'valid' output, a 'no' or an 'invalid' output, and 'nothing'.

The output layer 606 produces the neural network's predictions or classifications. Here, the output layer 606 includes a single binary output of either valid or invalid. By reducing the classification to valid or invalid, the size of the neural network is reduced, and the efficiency of processing the input data to determine the orientation is improved.

The embodiments disclosed herein represent a significant advancement in the classification of user orientation relative to the display interface, leveraging a smaller neural network 600 to perform tasks previously dependent on much larger networks. Conventional solutions necessitated expansive neural networks, which demanded substantial memory allocation for the storage of parameters, resulting in large model sizes and increased memory requirements for the memory 104. These requirements are not only cost-prohibitive but also impractical for deployment in devices with limited computational resources.

In contrast, the disclosed embodiments mitigate these challenges by introducing an optimized neural network architecture that significantly reduces the model's complexity without compromising accuracy or performance. By using a more compact network, the system's efficiency is markedly improved-requiring less memory and lowering both the power consumption and the cost associated with implementing such orientation classification systems. Consequently, this approach paves the way for broader applicability of intelligent orientation detection across various devices, including those with stringent resource constraints.

FIGS. 7-11 illustrate a classification of a sensor readout using the neural network 600 for different orientations of the head of the user 208 with respect to the ToF sensor 204. The description of the structure and function of identical components with the same reference number in FIGS. 2, 6, and 7 will not be repeated to simplify the discussion and avoid unnecessary duplication.

Figure 7:
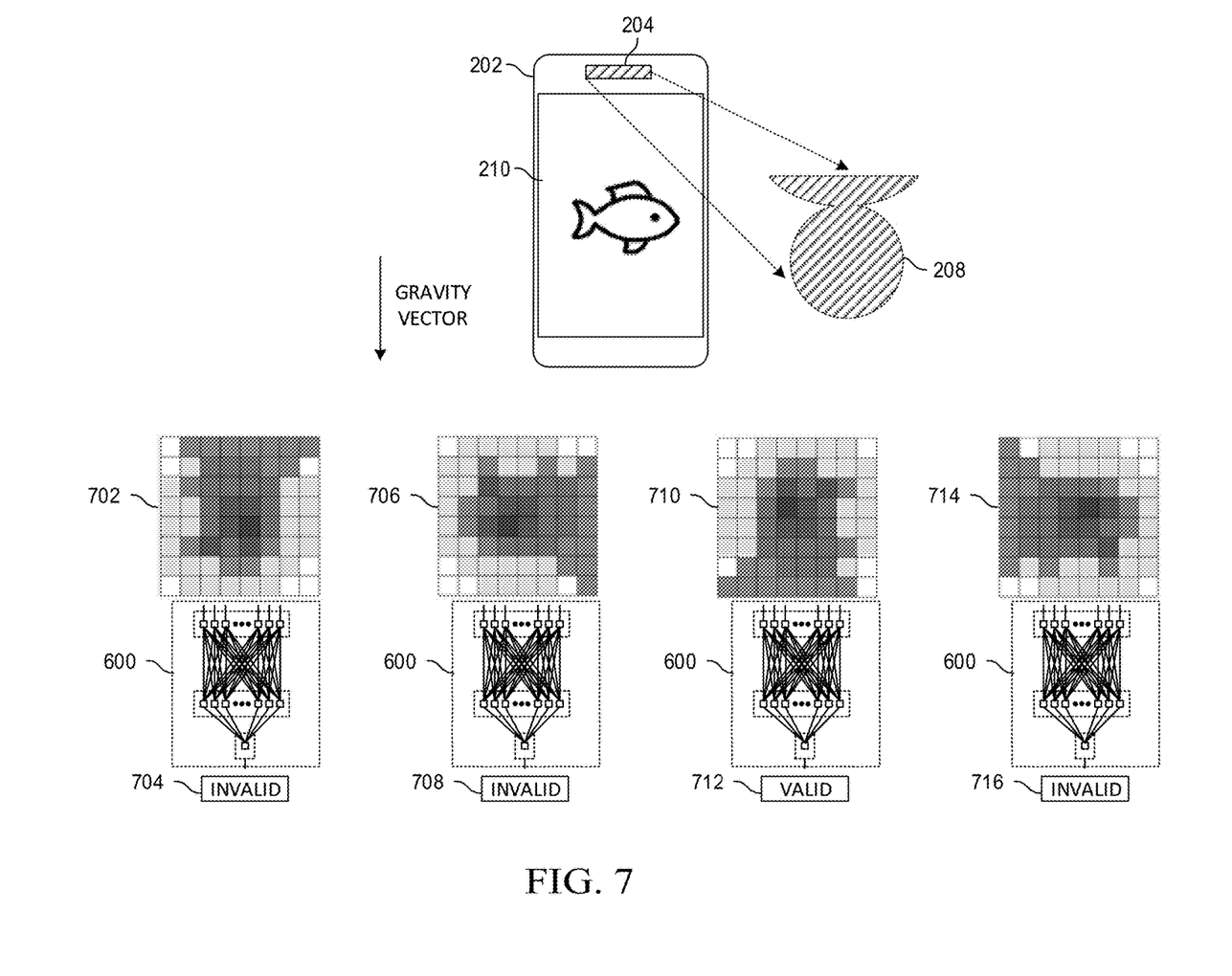
FIGS. 7-11 is a classification of a sensor readout using the neural network for different orientations of the head of the user with respect to the ToF sensor.

In FIG. 7, the head of user 208 is rotated 180 degrees with respect to the ToF sensor 204, represented by the original sensor readout 702. The neural network 600 is trained to provide a valid output only in response to a single orientation. Accordingly, the sensor readout 702, 706, and 714, when fed to the neural network 600, provides an invalid output 704, 708, and 716 because it is rotated by 90 or 180 degrees (i.e., not being 'upright' or whatever position was classified as correct). In contrast, the neural network provides a valid output 712 for the sensor readout 710, which is rotated by 180 degrees from the original orientation. Once system 100 has determined the valid orientation, system 100 rotates the image on the display interface 210 by 180 degrees to orient the image with the orientation of the head of user 208.

Figure 8:
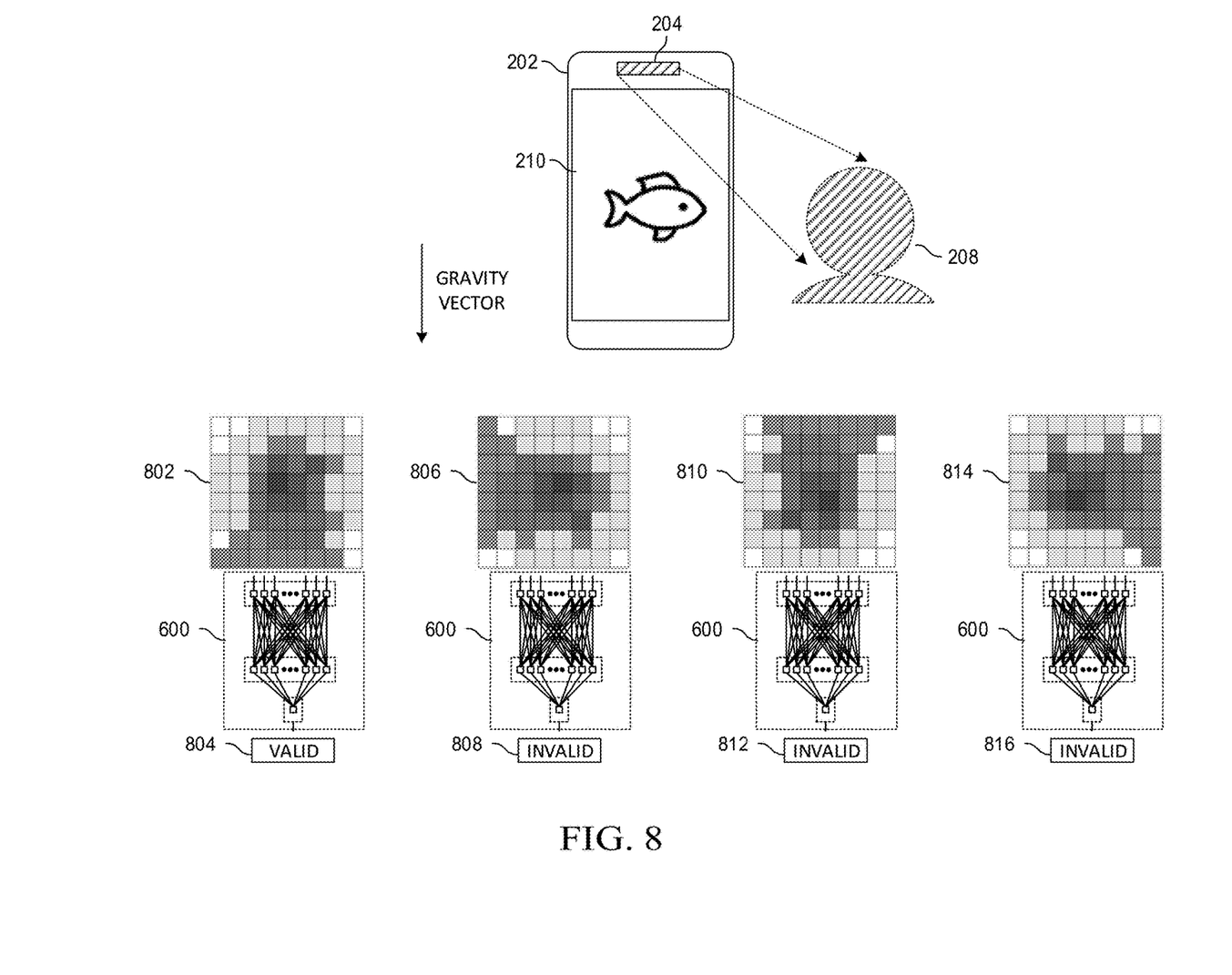

In FIG. 8, the head of user 208 is properly oriented with respect to the ToF sensor 204, represented by the original sensor readout 802. Accordingly, the rotated sensor readouts 806, 810, and 814, when fed to the neural network 600 provides an invalid output 808, 812, and 816 due to it being rotated by 90 or 180 degrees (i.e., not being 'upright'). In contrast, the neural network provides a valid output 804 for the non-modified sensor readout 802. As the head of the user 208 is oriented in the original sensor readout 802, system 100 does not need to rotate the image on display interface 210.

Figure 9:
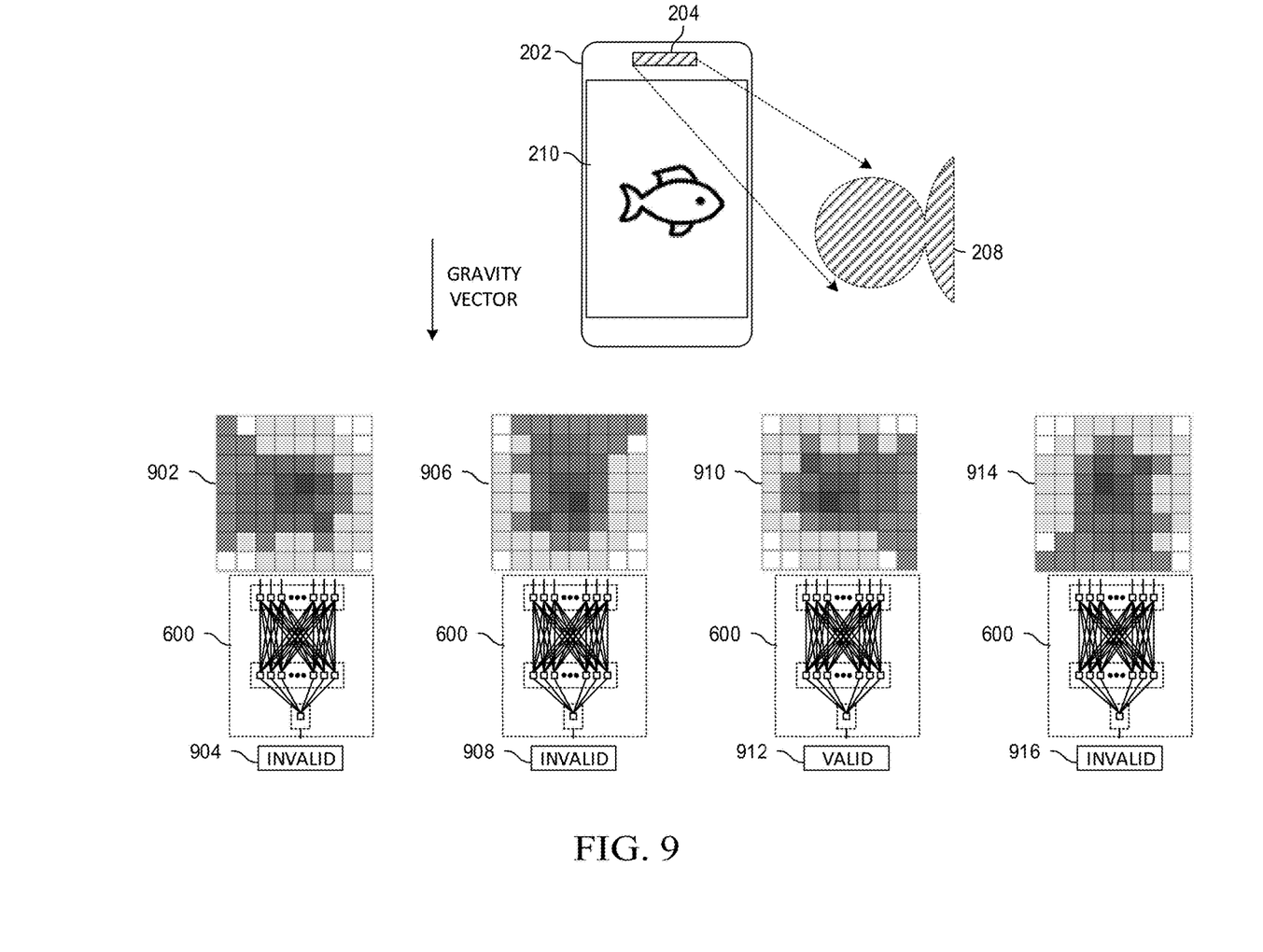

In FIG. 9, the head of user 208 is rotated 90 degrees with respect to the ToF sensor 204, represented by the original sensor readout 902. Accordingly, the sensor readout 902, 906, and 910, when fed to the neural network 600 provides an invalid output 904, 908, and 916 due to it being rotated by 90 or 180 degrees (i.e., not being 'upright' or whatever position was classified as correct). In contrast, the neural network provides a valid output 912 for the sensor readout 910, which is rotated 180 degrees from the original orientation. Once system 100 has determined the valid orientation, system 100 rotates the image on the display interface 210 by 180 degrees to orient the image with the orientation of the head of user 208.

Figure 10:
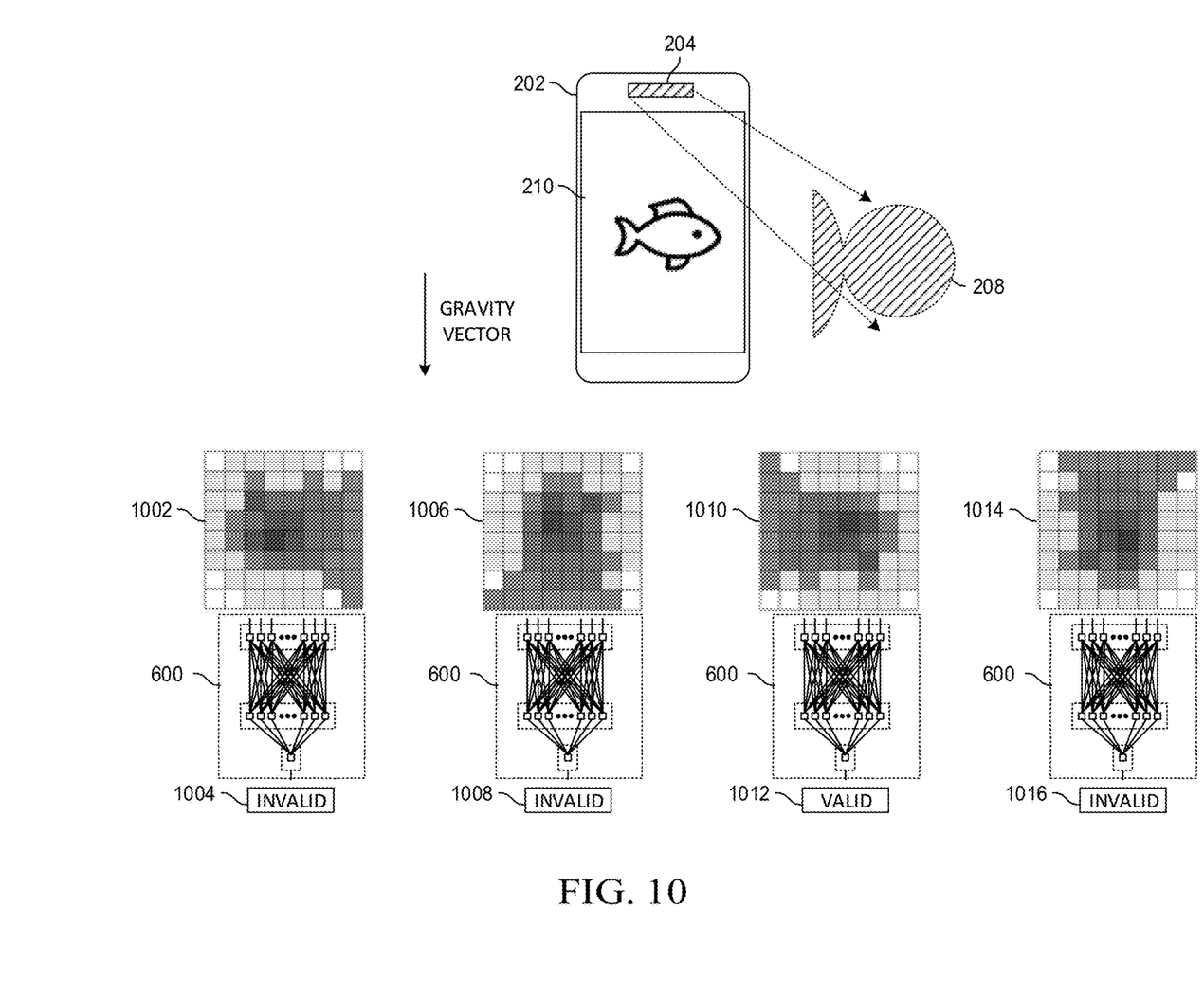

In FIG. 10, the head of user 208 is rotated 90 degrees with respect to the ToF sensor 204, represented by the original sensor readout 1002. Accordingly, the sensor readout 1002, 1006, and 1014, when fed to the neural network 600, provides an invalid output 1004, 1008, and 1016 because it is rotated by 90 or 180 degrees (i.e., not being 'upright' or whatever position was classified as correct). In contrast, the neural network provides a valid output 1012 for the sensor readout 1010, which is rotated 180 degrees from the original orientation. Once system 100 has determined the valid orientation, system 100 rotates the image on the display interface 210 by 180 degrees to orient the image with the orientation of the head of user 208.

In FIG. 11, the head of user 208 is absent from the field of view of the ToF sensor 204, represented by the original sensor readout 1102. With a three-class classifier (valid orientation, invalid orientation, no user), the sensor readout 1102, and rotated sensor readouts 1106, 1110, and 1114, when fed to the neural network 600 provide an output 1104, 1108, 1112, and 1116 corresponding to 'nothing', indicating that there is no user in the field of view. It should be appreciated that a neural network 600 may also be implemented with a different number of output nodes (in FIG. 11, the number of output nodes is three), such as one or two. In such embodiments, the neural network provides an output that is 'invalid' for all of these cases, indicating the absence of the user due to the counter algorithms' inability to match any rotation of the sensor readout with the correct orientation.

It is noted that although in FIGS. 7-10, the head of the user is shown to be rotated in 90 degrees at each step in a clockwise direction, it should be appreciated that the system can use different degrees (e.g., 1 degree, 2 degrees, 15 degrees, etc.) and that the rotation can be implemented in either the clockwise or counterclockwise directions as well as other combinations of these transformations.

Further, it should be appreciated that the embodiments of this disclosure are not limited to the specific implementation as disclosed. For example, in embodiments, the original image can be rotated counter clockwise 270 degrees, then rotated clockwise 180 degrees, and then rotated counter clockwise 90 degrees. Essentially, as long as each orientation is checked, the system can feed these orientations into the neural network 600 to determine a valid or invalid output based thereon.

A first aspect relates to a method for determining an orientation of an object in a field-of-view of a time-of-flight sensor. The method includes receiving a sensor readout from the time-of-flight sensor; feeding the sensor readout as an input to a neural network, the neural network trained on a set of data with a binary output that classifies the input as being valid or invalid based on the orientation of the object with respect to the time-of-flight sensor; rotating the sensor readout for a set number of rotations and feeding each rotation as an input to the neural network to determine a valid orientation of the object; and rotating an image on a display interface based on the rotation corresponding to the valid orientation of the object as determined by the neural network.

In a first implementation form of the method according to the first aspect as such, the set number of rotations equals four.

In a second implementation form of the method according to the first aspect as such or any preceding implementation form of the first aspect, the object is a head of a user, and the valid orientation of the object corresponds to an alignment of the orientation of the time-of-flight sensor and the head of the user.

In a third implementation form of the method according to the first aspect as such or any preceding implementation form of the first aspect, the object is a parcel with an identifying feature on one corner, and the valid orientation of the object corresponds to an alignment of the orientation of the time-of-flight sensor and the parcel.

In a fourth implementation form of the method according to the first aspect as such or any preceding implementation form of the first aspect, the method includes detecting an invalid output for each rotation of the sensor readout and, based thereon, determining that the object is not positioned in the field-of-view of the time-of-flight sensor.

In a fifth implementation form of the method according to the first aspect as such or any preceding implementation form of the first aspect, the set number of rotations is greater than four. The method further includes detecting an angle of the orientation of the object based on a counter value corresponding to a valid output from the neural network.

In a sixth implementation form of the method according to the first aspect as such or any preceding implementation form of the first aspect, the time-of-flight sensor is a multi-zone time-of-flight sensor. The sensor readout is a grid-based data set indicating distance measurements and spatial depth maps for each zone of the multi-zone time-of-flight sensor.

A second aspect relates to a system. The system includes a time-of-flight sensor, a non-transitory memory, and a processor. The time-of-flight sensor is configured to measure a distance between it and an object in its field of view. The non-transitory memory storage includes instructions. The processor is in communication with the non-transitory memory storage and the time-of-flight sensor. The instructions, when executed by the processor, cause the system to receive a sensor readout from the time-of-flight sensor, feed the sensor readout as an input to a neural network, the neural network trained on a set of data with a binary output that classifies the input as being valid or invalid based on an orientation of the object with respect to the time-of-flight sensor, rotate the sensor readout for a set number of rotations and feed each rotation as an input to the neural network to determine a valid orientation of the object, and rotate an image on a display interface based on the rotation corresponding to the valid orientation of the object as determined by the neural network.

In a first implementation form of the system according to the second aspect as such, the set number of rotations equals four.

In a second implementation form of the system according to the second aspect as such or any preceding implementation form of the second aspect, the object is a head of a user, and the valid orientation of the object corresponds to an alignment of the orientation of the time-of-flight sensor and the head of the user.

In a third implementation form of the system according to the second aspect as such or any preceding implementation form of the second aspect, the object is a parcel with an identifying feature on one corner, and the valid orientation of the object corresponds to an alignment of the orientation of the time-of-flight sensor and the parcel.

In a fourth implementation form of the system according to the second aspect as such or any preceding implementation form of the second aspect, the instructions, when executed by the processor, cause the system to detect an invalid output for each rotation of the sensor readout and, based thereon, determine that the object is not positioned in a field-of-view of the time-of-flight sensor.

In a fifth implementation form of the system according to the second aspect as such or any preceding implementation form of the second aspect, the set number of rotations is greater than four. The instructions, when executed by the processor, cause the system to detect an angle of the orientation of the object based on a counter value corresponding to a valid output from the neural network.

In a sixth implementation form of the system according to the second aspect as such or any preceding implementation form of the second aspect, the time-of-flight sensor is a multi-zone time-of-flight sensor. The sensor readout is a grid-based data set indicating distance measurements and spatial depth maps for each zone of the multi-zone time-of-flight sensor.

A third aspect relates to a non-transitory computer-readable media storing computer instructions. The instructions, when executed by a processor, cause the processor to receive a sensor readout from a time-of-flight sensor for an object in a field-of-view of the time-of-flight sensor; feed the sensor readout as an input to a neural network, the neural network trained on a set of data with a binary output that classifies the input as being valid or invalid based on an orientation of the object with respect to the time-of-flight sensor; rotate the sensor readout for a set number of rotations and feed each rotation as an input to the neural network to determine a valid orientation of the object; and rotate an image on a display interface based on the rotation corresponding to the valid orientation of the object as determined by the neural network.

In a first implementation form of the non-transitory computer-readable media according to the third aspect as such, the set number of rotations equals four.

In a second implementation form of the non-transitory computer-readable media according to the third aspect as such or any preceding implementation form of the third aspect, the object is a head of a user, and the valid orientation of the object corresponds to an alignment of the orientation of the time-of-flight sensor and the head of the user.

In a third implementation form of the non-transitory computer-readable media according to the third aspect as such or any preceding implementation form of the third aspect, the object is a parcel with an identifying feature on one corner, and the valid orientation of the object corresponds to an alignment of the orientation of the time-of-flight sensor and the parcel.

In a fourth implementation form of the non-transitory computer-readable media according to the third aspect as such or any preceding implementation form of the third aspect, the instructions, when executed by the processor, cause the processor to detect an invalid output for each rotation of the sensor readout and, based thereon, determine that the object is not positioned in the field-of-view of the time-of-flight sensor.

In a fifth implementation form of the non-transitory computer-readable media according to the third aspect as such or any preceding implementation form of the third aspect, the time-of-flight sensor is a multi-zone time-of-flight sensor. The sensor readout is a grid-based data set indicating distance measurements and spatial depth maps for each zone of the multi-zone time-of-flight sensor.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method for determining an orientation of an object in a field-of-view of a time-of-flight sensor, the method comprising:
   receiving a sensor readout from the time-of-flight sensor;
   feeding the sensor readout as an input to a neural network, the neural network trained on a set of data with a binary output that classifies the input as being valid or invalid based on the orientation of the object with respect to the time-of-flight sensor;
   rotating the sensor readout for a set number of rotations and feeding each rotation as an input to the neural network to determine a valid orientation of the object; and
   rotating an image on a display interface based on the rotation corresponding to the valid orientation of the object as determined by the neural network.

2. The method of claim 1, wherein the set number of rotations equals four.

3. The method of claim 1, wherein the object is a head of a user, and the valid orientation of the object corresponds to an alignment of the orientation of the time-of-flight sensor and the head of the user.

4. The method of claim 1, wherein the object is a parcel with an identifying feature on one corner, and the valid orientation of the object corresponds to an alignment of the orientation of the time-of-flight sensor and the parcel.

5. The method of claim 1, further comprising detecting an invalid output for each rotation of the sensor readout and, based thereon, determining that the object is not positioned in the field-of-view of the time-of-flight sensor.

6. The method of claim 1, wherein the set number of rotations is greater than four, and wherein the method further comprises detecting an angle of the orientation of the object based on a counter value corresponding to a valid output from the neural network.

7. The method of claim 1, wherein the time-of-flight sensor is a multi-zone time-of-flight sensor, and wherein the sensor readout is a grid-based or a point cloud data set indicating distance measurements and spatial depth maps for each zone of the multi-zone time-of-flight sensor.

8. A system, comprising:
   a time-of-flight sensor configured to measure a distance between it and an object in its field of view;
   a non-transitory memory storage comprising instructions; and
   a processor in communication with the non-transitory memory storage and the time-of-flight sensor, wherein the instructions, when executed by the processor, cause the system to:
   receive a sensor readout from the time-of-flight sensor, feed the sensor readout as an input to a neural network, the neural network trained on a set of data with a binary output that classifies the input as being valid or invalid based on an orientation of the object with respect to the time-of-flight sensor, rotate the sensor readout for a set number of rotations and feed each rotation as an input to the neural network to determine a valid orientation of the object, and rotate an image on a display interface based on the rotation corresponding to the valid orientation of the object as determined by the neural network.

9. The system of claim 8, wherein the set number of rotations equals four.

10. The system of claim 8, wherein the object is a head of a user, and the valid orientation of the object corresponds to an alignment of the orientation of the time-of-flight sensor and the head of the user.

11. The system of claim 8, wherein the object is a parcel with an identifying feature on one corner, and the valid orientation of the object corresponds to an alignment of the orientation of the time-of-flight sensor and the parcel.

12. The system of claim 8, wherein the instructions, when executed by the processor, cause the system to detect an invalid output for each rotation of the sensor readout and, based thereon, determine that the object is not positioned in a field-of-view of the time-of-flight sensor.

13. The system of claim 8, wherein the set number of rotations is greater than four, and wherein the instructions, when executed by the processor, cause the system to detect an angle of the orientation of the object based on a counter value corresponding to a valid output from the neural network.

14. The system of claim 8, wherein the time-of-flight sensor is a multi-zone time-of-flight sensor, and wherein the sensor readout is a grid-based or a point cloud data set indicating distance measurements and spatial depth maps for each zone of the multi-zone time-of-flight sensor.

15. A non-transitory computer-readable media storing computer instructions that, when executed by a processor, cause the processor to:

receive a sensor readout from a time-of-flight sensor for an object in a field-of-view of the time-of-flight sensor;

feed the sensor readout as an input to a neural network, the neural network trained on a set of data with a binary output that classifies the input as being valid or invalid based on an orientation of the object with respect to the time-of-flight sensor;

rotate the sensor readout for a set number of rotations and feed each rotation as an input to the neural network to determine a valid orientation of the object; and rotate an image on a display interface based on the rotation corresponding to the valid orientation of the object as determined by the neural network.

16. The non-transitory computer-readable media of claim 15, wherein the set number of rotations equals four.

17. The non-transitory computer-readable media of claim 15, wherein the object is a head of a user, and the valid orientation of the object corresponds to an alignment of the orientation of the time-of-flight sensor and the head of the user.

18. The non-transitory computer-readable media of claim 15, wherein the object is a parcel with an identifying feature on one corner, and the valid orientation of the object corresponds to an alignment of the orientation of the time-of-flight sensor and the parcel.

19. The non-transitory computer-readable media of claim 15, wherein the instructions, when executed by the processor, cause the processor to detect an invalid output for each rotation of the sensor readout and, based thereon, determine that the object is not positioned in the field-of-view of the time-of-flight sensor.

20. The non-transitory computer-readable media of claim 15, wherein the time-of-flight sensor is a multi-zone time-of-flight sensor, and wherein the sensor readout is a grid-based or a point cloud data set indicating distance measurements and spatial depth maps for each zone of the multi-zone time-of-flight sensor.

* * * * *